United States Patent [19]

Brandener

[11] Patent Number: 4,928,998
[45] Date of Patent: May 29, 1990

[54] FLEXIBLE EXHAUST COUPLING

[75] Inventor: Louis Brandener, Poissy, France

[73] Assignee: Societe Jacques DuBois, Barentin, France

[21] Appl. No.: 332,736

[22] Filed: Apr. 4, 1989

[30] Foreign Application Priority Data

Apr. 12, 1988 [FR] France .................................. 8804813

[51] Int. Cl.$^5$ ............................................. F16L 55/04
[52] U.S. Cl. ..................................... 285/49; 285/267; 285/910
[58] Field of Search .................. 285/49, 267, 268, 269, 285/270, 910, 917, 923

[56] References Cited

U.S. PATENT DOCUMENTS

| 4,097,071 | 6/1978 | Crawford et al. | 285/267 X |
| 4,516,782 | 5/1985 | Usher | 285/910 X |
| 4,747,624 | 5/1988 | Faber et al. | 285/917 X |

FOREIGN PATENT DOCUMENTS

| 0250901 | 1/1988 | European Pat. Off. | |
| 2829333 | 5/1979 | Fed. Rep. of Germany. | |
| 3317512 | 12/1984 | Fed. Rep. of Germany. | |
| 3618485 | 1/1987 | Fed. Rep. of Germany. | |
| 2522726 | 9/1983 | France | 285/268 |

*Primary Examiner*—Dave W. Arola
*Attorney, Agent, or Firm*—Sixby, Friedman, Leedom & Ferguson

[57] ABSTRACT

A flexible exhaust coupling comprising a first length of pipe (1) terminating in a convex spherical bearing part, a first connecting flange (2) associated with the first length of pipe, a second length of pipe (7) terminating in a concave spherical bearing part facing the convex spherical bearing part of the first length of pipe, a second connecting flange (6) associated with the second length of pipe and clamping means (10) arranged in conjunction with thrust members (11) to urge the connecting flanges towards each other. The exhaust coupling also includes vibration-damping members (15) located between at least one of the connecting flanges and the corresponding clamping means.

9 Claims, 2 Drawing Sheets

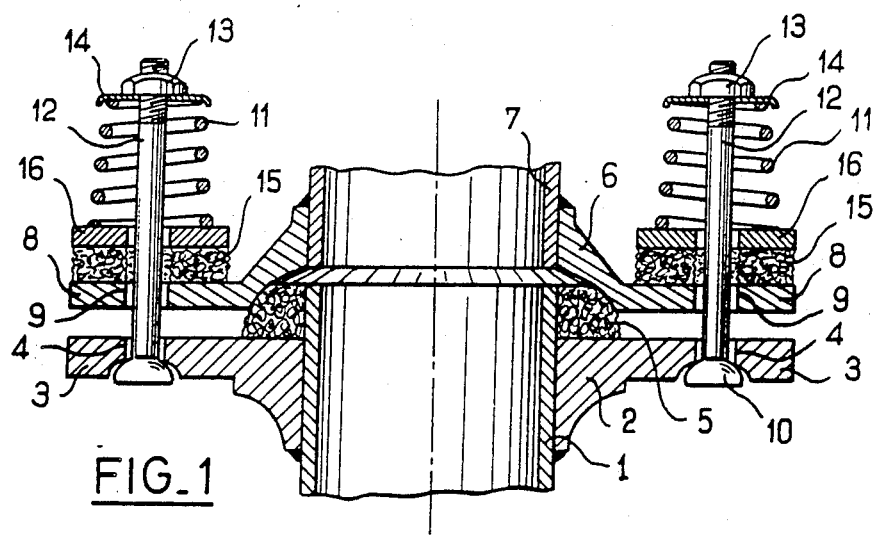
FIG_1
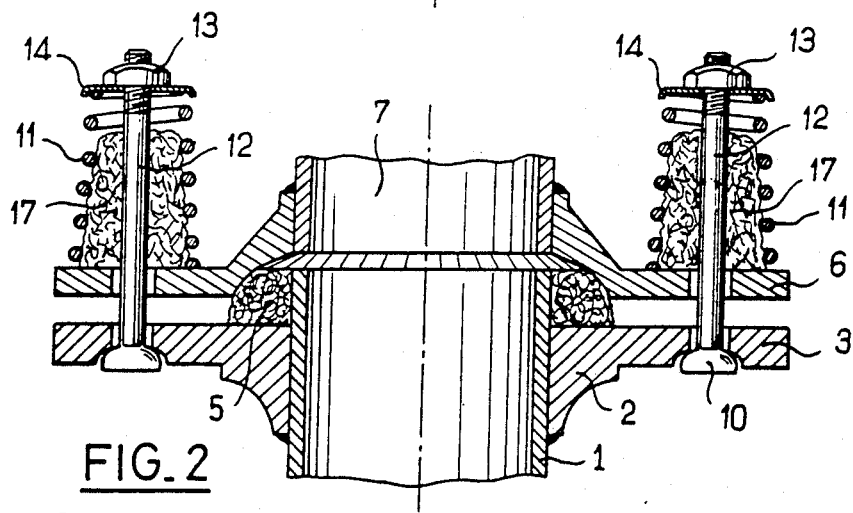
FIG_2
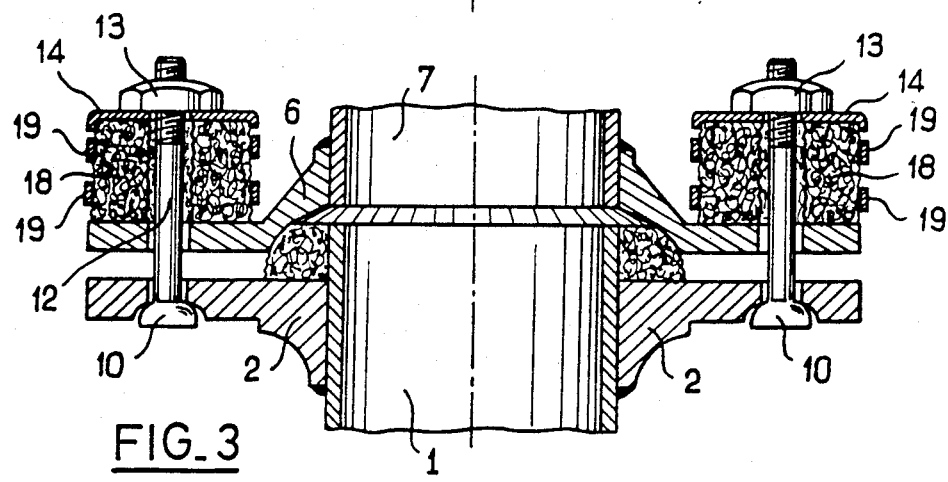
FIG_3

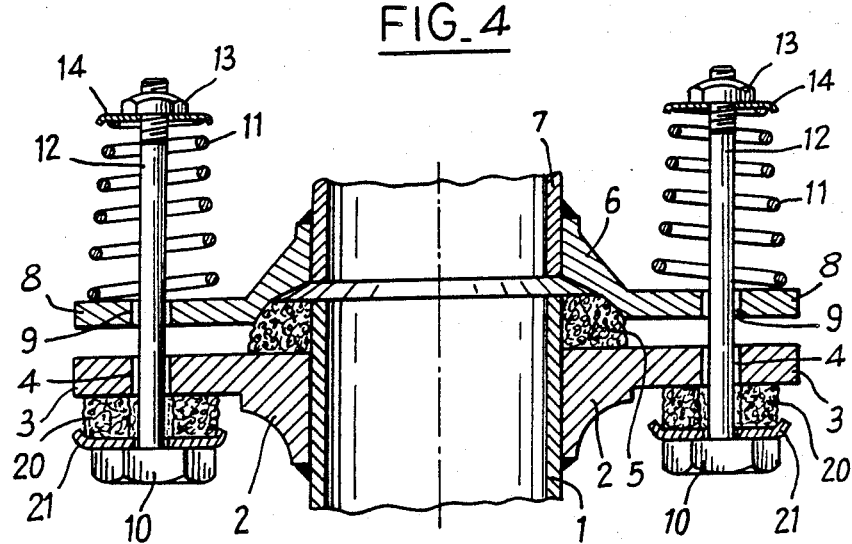
FIG_4
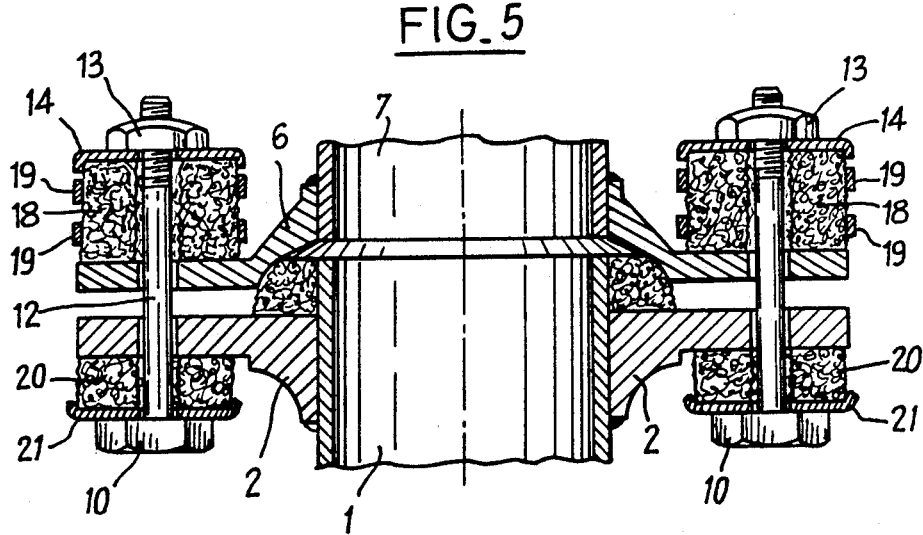
FIG_5

FLEXIBLE EXHAUST COUPLING

The present invention relates to a ball and socket exhaust coupling between two lengths of exhaust pipe.

BACKGROUND OF THE INVENTION

It is well known that when assembling a motor vehicle, particularly one with a transverse engine, it is necessary to provide a flexible coupling between the exhaust manifold which is fixed to the engine, and the exhaust pipe which is fixed to the bodywork and which supports the silencer.

In order to take up the relative movement between the manifold and the exhaust pipe, and to prevent leaks, one of the lengths of pipe terminates in a convex spherical mating surface, either fashioned from the end of the tube itself or formed by an annular gasket, which cooperates with a complementary surface on the other length of pipe. In order to hold the parts together in such a case, the exhaust manifold and the exhaust pipe include respective connecting flanges associated with each length of pipe and joined together by means of bolts, each of which is surrounded by a compression spring to ensure a leak-proof coupling.

Upon relative movement of the two lengths of exhaust pipe, the two spherical surfaces rub against each other generating extremely unpleasant vibrations. The level of these vibrations has already been reduced by providing a special type of gasket between the facing ends of the lengths of exhaust pipe. However, it has not yet been possible to completely suppress the vibrations generated by the various parts of the coupling rubbing together during use.

Although the production of vibrations cannot be totally suppressed, one object of the invention is to minimize their effects.

SUMMARY OF THE INVENTION

In order to achieve this goal, a flexible coupling according to the invention comprises a first length of pipe terminating in a convex spherical bearing part, a first connecting flange associated with the first length of pipe, a second length of pipe terminating in a concave spherical bearing part facing the convex spherical bearing part of the first length of pipe, a second connecting flange associated with the second length of pipe, and clamping means arranged, in conjunction with thrust members, to urge the flanges towards each other, the coupling having vibration-damping members arranged between at least one of the connecting flanges and the corresponding clamping means.

It has been found that vibrations in the audible frequency range are thereby completely suppressed, partly because the vibration-damping members prevent the connecting flanges with which they are associated from resonating, and partly because they act as a vibration isolator between the connecting flanges and the clamping means so that vibration of the clamping means is also avoided.

Advantageously, the vibration-damping members comprise pads of resilient fibers, these pads preferably being made from a compressed steel wire knit and having a density in the range 1.5 to 3. It has been found that the dry friction developed between the fibers and more particularly between the stitches of the steel wire knit very significantly dissipates the vibrational energy generated at the ends of the flange and almost totally destroys the ability of the flange to enter into resonance.

BRIEF DESCRIPTION OF THE DRAWINGS

Embodiments of the invention are described by way of example with reference to the accompanying drawings, in which:

FIG. 1 is an axial sectional view of a first exhaust coupling according to the invention, FIG. 2 is an axial sectional view of a second exhaust coupling according to the invention, FIG. 3 is an axial sectional view of a third exhaust coupling according to the invention, FIG. 4 is an axial sectional view of a fourth exhaust coupling according to the invention, FIG. 5 is an axial sectional view of a fifth exhaust coupling according to the invention.

DETAILED DESCRIPTION

Referring to FIG. 1, the flexible exhaust coupling of the invention includes a first length of pipe 1 on which a first connecting flange 2 is secured, for example by welding, the flange including lugs 3 with through holes 4 in conventional manner. An annular gasket 5 is mounted on the end of the first length of pipe, with one of its faces bearing against the first connecting flange 2. The annular gasket 5 comprises an outside bearing surface of convex spherical shape against which bears a concave spherical bearing surface which faces the convex spherical bearing surface and which is carried by a second connecting flange 6 secured to the end of a second length of exhaust pipe 7. The second connecting flange 6 comprises lugs 8 furnished with through holes 9.

Clamping means formed by bolts 10 passing through the openings 4 and 9 are arranged so as to urge the connecting flanges 2 and 6 towards each other in conjunction with thrust members formed by helical springs 11, each bolt having one such spring around a part of its stem 12 which extends on the side of the second connecting flange 6. A nut 13 bearing on a cup washer 14 compresses the springs 11 to ensure sufficient force between the spherical surfaces.

In this first embodiment of the invention, the coupling includes vibration-damping members in the form of annular pads 15, each of which is arranged between one end of a helical spring 11 and the corresponding connecting flange 6. Preferably the annular pads 15 are made from knitted steel wire. For example, the annular pads 15 may be made by producing a tubular knit of steel wire having a diameter lying in the range 0.1 mm to 0.3 mm and tensile strength of 100 daN/mm$^2$ or more, the tubular knit then being flattened over a cylindrical preform which is compressed axially so that the resulting annular pad has a rest density of between 1.5 and 3, and preferably about 2.

In order to prevent the spring 11 penetrating the pads 15 when in use, it is preferable to place a metal washer 16 between the end of each spring 11 and the corresponding annular pad 15.

In use, the nuts 13 are tightened until the desired compression force between the connecting flanges is obtained this being generally of the order of 50 kg. Under such conditions, the annular pads 15 are lightly compressed relative to their rest state but retain elasticity, and experience has shown that they thereby provide very significant damping of the vibrations created in the second connecting flange 6 by the rubbing of the spherical bearing surfaces. The coupling thus produced can function for many hours without generating objectionable sounds of the user of the vehicle on which the coupling is mounted.

FIG. 2 shows a second embodiment of the invention in which the coupling is generally identical in structure to that shown in FIG. 1. However, in this embodiment, the annular pads 15 are replaced by vibration-damping bushes 17 which are likewise preferably made of resilient fibers, either from a steel wire knit as previously described or from non-woven fibers which are tangled together and possibly lightly compressed to ensure cohesion. The bush 17 surrounds the stem 12 of the bolt 10 and makes contact with the turns of the helical spring 11. Although in the embodiment shown the bush 17 is shorter than the distance between the lug 8 of the second connecting flange 6 and the cup washer 14, it is possible to use bushes 17 which have a rest length equal to or even slightly greater than that distance so that the bush 17 is further lightly compressed wen the nut 13 is tightened. Also, although in the embodiment shown the vibration-damping bushes 17 are located inside the springs 11, it is possible to make a coupling in which the bushes 17 extend outside the springs 11 or even in which they are completely outside the springs 11.

FIG. 3 shows a third embodiment in which the helical springs 11 are absent, being replaced by tubular bushings 18 which act both as thrust members (like the helical springs 11) and as vibration-damping members. In this embodiment, the bushings 18 are preferably made from a steel wire knit as previously described. For example, for bolts which are 8 mm in diameter, a cylindrical preform is made from a strip of steel wire knit about 70 mm wide and 20 cm in length; this is rolled up to form a cylindrical preform which is then compressed axially until its rest height is about 25 mm. In order to ensure sufficient cohesion in the bushing, it is preferably surrounded by retaining means such as rings 19, clamps or a tubular net made either of an identical wire to that of the metal knit or of a softer wire.

FIG. 4 shows a fourth embodiment having a similar construction to that of FIG. 1. In this fourth embodiment, however, the annular pads 15 are removed and replaced by similar annular pads 20, each pad being located between the connecting flange 2 and the end of the bolt 10 adjacent that connecting flange. Preferably, each bolt 10 is centered on the coresponding annular pad 20 by means of a cup washer 21.

Thus the springs 11 are mounted between the ends of the bolts 10 and the adjacent connecting flanges 6, whereas the vibration-damping members 20 are mounted between the opposite ends of the bolts and the adjacent connecting flanges 2. The bolts 10 are therefore completely decoupled from the connecting flanges and bench tests have shown that this embodiment gives the greatest reduction in audible noise.

FIG. 5 shows a fifth embodiment similar to that of FIG. 3, but further including annular pads 20 on the opposite side of the connecting flanges. As in the fourth embodiment, the bolts 20 are preferably centered by cup washers 21, each washer preventing the head of the bolt from penetrating into the annular pad 20.

Naturally, the invention is not limited to the embodiments described and variations can be made to them without departing from the scope of the invention. In particular, in the case of FIG. 1, although the helical springs 11 are placed on the same side as the second connecting flange 6, they could be placed on the same side as the first connecting flange. Of course, the bolts 10 shown may similarly be replaced by studs fixed to one of the connecting flanges or by screws secured in holes tapped in one of the connecting flanges.

Although in the embodiments shown the concave spherical surface is carried by the second connecting flange, it is equally possible to provide a second length of connecting pipe which flares out at its end to form the spherical concave surface; the second connecting flange may either be forced over the second length of exhaust pipe and secured to it by welding or may even be loosely mounted on the second length of exhaust pipe.

Although in the illustrated embodiments the convex end surface of the first length of pipe is carried by an annular gasket 5 separate from the pipe, a convex end surface may be formed directly on the end of the length of pipe, or alternatively may be carried on a metal ring fixed to the end of the length of pipe and associated with a second length of pipe having a convex spherical end surface.

Although in the illustrated embodiments, the vibration damping pads make direct contact with the flange, a washer having a restricted central opening may be located between the end of each pad and the flange in order to avoid penetration of the pads into the openings 9 in the flange, particularly if those openings have been made wide in order to allow the flange to deflect when the lengths of exhaust pipe move relative to each other.

I claim:

1. A flexible exhaust coupling comprising a first length of pipe terminating in a convex spherical bearing part, a first connecting flange associated with the first length of pipe, a second length of pipe terminating in a concave spherical bearing part which faces the convex spherical bearing part of the first length of pipe, a second connecting flange associated with the second length of pipe, bolt means having ends for holding said bearing parts in sealing engagement with said bolt means extending through openings in said connecting flanges, helical springs surrounding stems of bolt means, said helical springs having one end facing an end of said bolt means and a second end facing one of said connecting flanges, and at least one vibration damping annular pad surrounding the stem of each bolt means and pressed between one end of the corresponding helical spring and an adjacent portion of said coupling.

2. An exhaust coupling according to claim 1, wherein said vibration damping annular pads are made of compressed steel wire knit.

3. A flexible exhaust coupling comprising a first length of pipe terminating in a convex spherical bearing part, a first connecting flange associated with the first length of pipe, a second length of pipe terminating in a concave spherical bearing part which faces the convex spherical bearing part of the first length of pipe, a second connecting flange associated with the second length of pipe,
   bolt means having ends for holding said bearing parts in sealing engagement with said bolt means extending through openings in said connecting flanges, helical springs surrounding a stem of said bolt means and having one end contacting an end of said bolt means and a second end contacting one of said connecting flanges, and vibration damping bushings surrounding the stem of each bolt means and contacting at least one portion of said stem and one turn of a corresponding helical spring.

4. A flexible exhaust coupling according to claim 3, wherein said vibration damping bushings are made of compressed steel wire knit.

5. A flexible exhaust coupling comprising a first length of pipe terminating in a convex spherical bearing part, a first connecting flange associated with the first length of pipe, a second length of pipe terminating in a concave spherical bearing part which faces the convex spherical bearing part of the first length of pipe, a second connecting flange associated with the second length of pipe, bolt means having ends for holding said bearing parts in sealing engagement with said bolt means extending through openings in said connecting flanges and having said ends facing said connecting flanges, helical springs surrounding a stem of said bolt means and having one end contacting one end of said bolt means and a second end contacting one of said connecting flanges, and a vibration damping annular pad surrounding the stem of said bolt means and pressed between a second end of said bolt means and the corresponding connecting flange.

6. A flexible exhaust coupling according to claim 5, wherein said vibration damping annular pads are made of compressed steel wire knit.

7. A flexible exhaust coupling comprising a first length of pipe terminating in a convex spherical bearing part, a first connecting flange associated with the first length of pipe, a second length of pipe terminating in a concave spherical bearing part which faces the convex spherical bearing part of the first length of pipe, a second connecting flange associated with the second length of pipe, bolt means having ends for holding said bearing parts in sealing engagement with said bolt means extending through openings in said connecting flanges and said ends each facing a corresponding connecting flange, and at least one resilient and vibration damping tubular bushing surrounding a stem of each bolt means and pressed between an end of said bolt means and a corresponding connecting flange.

8. A flexible exhaust coupling according to claim 7, wherein bushings are associated with both ends of each bolt means.

9. A flexible exhaust coupling according to claim 7 or claim 16, wherein said bushings are made of compressed steel wire knit.

* * * * *